T. A. EDISON.
Electric-Telegraphs.
No. 147,311. Patented Feb. 10, 1874.
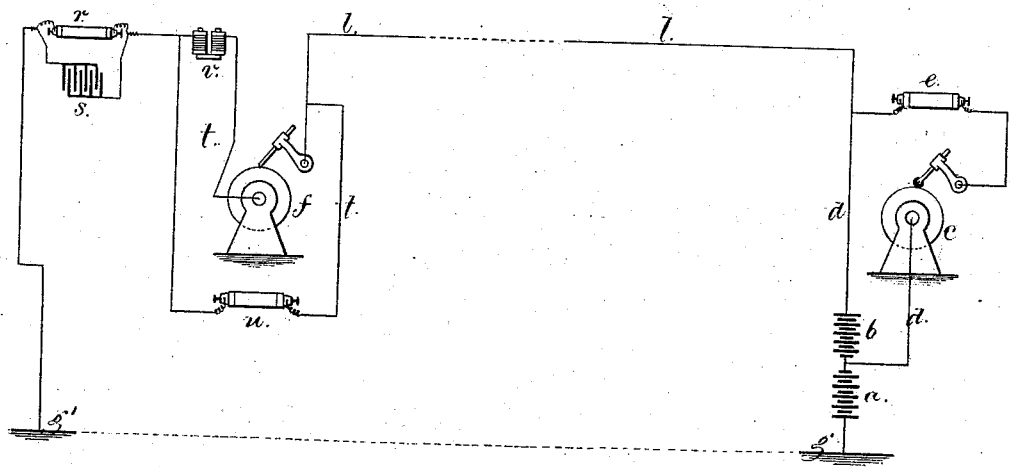
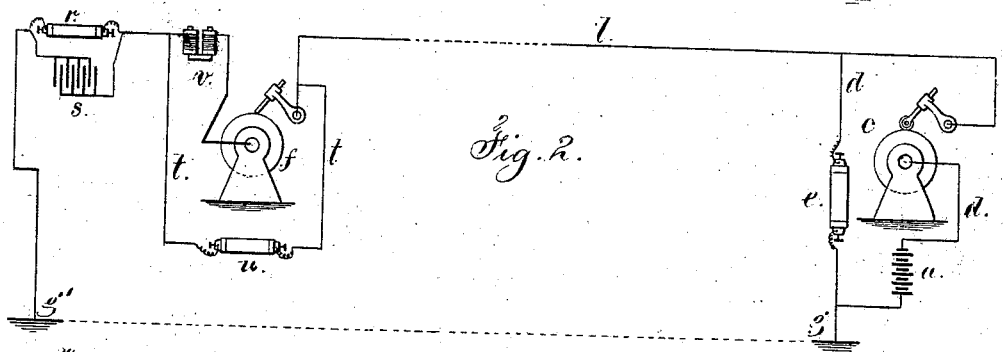
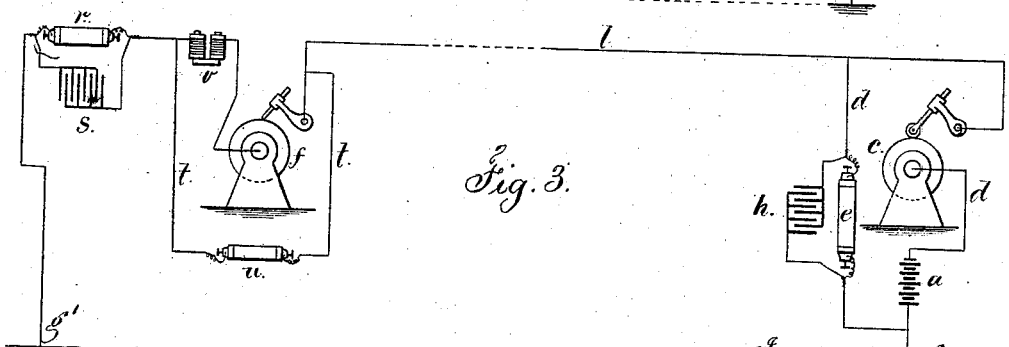

UNITED STATES PATENT OFFICE.

THOMAS A. EDISON, OF NEWARK, NEW JERSEY, ASSIGNOR TO HIMSELF AND GEORGE HARRINGTON, OF WASHINGTON, D. C.

IMPROVEMENT IN ELECTRIC TELEGRAPHS.

Specification forming part of Letters Patent No. 147,311, dated February 10, 1874; application filed July 29, 1873.

CASE 82.

*To all whom it may concern:*

Be it known that I, THOMAS A. EDISON, of Newark, in the county of Essex and State of New Jersey, have invented an Improvement in Electric Telegraphs, of which the following is a specification:

In cables and long telegraph-lines there is a limit to the speed with which perfect signals can be transmitted and received, whether the receiving-instrument consists of an electro-magnet, a galvanometer, a relay, or a chemical-telegraph instrument. This limit in speed arises from the fact that the moment the line or cable is charged by the battery being connected, a static charge is instantly set up, which is in an opposite direction to the dynamic charge, and the tendency is to defer the reception of the signal at the distant station, and at the moment of breaking the battery-connection, the static charge disperses by dividing at the center of resistance, and going in both directions, one part going to the ground at the transmitting station in a direction opposed to the battery, and the other part going toward the receiving-instrument in the same direction as the previous current from the battery. This electrical condition is of sufficient duration to render the signals unintelligible at the receiving-instrument after a certain speed is attained. The time of discharge is directly proportioned to the resistance at the points of discharge at the ends of the line, and the result is that the speed of the instruments is limited to the speed with which the line will free itself through the channels aforesaid.

My invention relates to the discovery of a method of neutralizing the effects of the static charge in any length of line or cable, by balancing the electric forces, and the discovery of a point of no electric tension or zero, as regards the static charge, so that the receiving-instrument, when located at that point, will be operated by the rise of tension produced by a pulsation that is connected at such receiving-instrument, and made as instantly and definitely operative as the pulsation given at the transmitting station.

I obtain this point of no tension by forming at the receiving end an artificial line, having an equal or nearly equal resistance and electro-static capacity, or capacity for producing static charges, as that of the cable or land line, and connect this with the line or cable, and place between the cable and the artificial line the receiving-instrument, which hence is in the center of resistance and static accumulation. When this balance is obtained, the signals are received perfect, and the rapidity is governed only by the strength of the battery.

The artificial line is made with an adjustable rheostat; liquid in a tube is preferable. I connect, between the receiving-instrument and the earth, one or more condensers, or other accumulators of static electricity, which are made adjustable by having them in sections, and bringing one or more sections in or out by a switch, so as to increase or decrease the static charge from the artificial cable. It may also be done by placing a very high adjustable resistance-coil between one leaf of the condenser and the artificial line. I maintain a very low resistance between the line and the ground at the transmitting station, so as to discharge the static current at this end as rapidly as possible.

The mode which I prefer is to keep my transmitting-battery in circuit at all times, and include in the same circuit another battery of equal power with opposite poles, so that, when both are in, there is no current generated, and the resistance of the wire to earth is no more than the resistance of the battery. The transmission of a pulsation is made, when the circuit is closed, through the perforation in the paper, or otherwise, so as to short-circuit or shunt the neutralizing battery, and send a current upon the line. The current at the receiving-paper is shunted through a resistance, so as to preserve a constant and equal resistance, which the chemical receiving-paper does not give, owing to being more damp in one place than another. In balancing the resistance and static current, the resistance of the instrument is to be added to the line, and the resistance of the two equalized by the same amount of resistance in the artificial cable or line. If the receiving-instrument is out of the center of resistance toward the line, the pulsations will be weakened by the static charge acting against the pulsation; but if the instrument is toward the artificial cable on the other side of the zero-point, the signals or characters will be slightly prolonged, owing to the static charge discharging in the same direction as the current. It is at this point that I prefer to place the instrument, because, by placing an electro-magnet in the shunt of the receiving-instrument, I obtain enough counter-discharge from that magnet to cut off this prolongation locally, and this discharge from the magnet will not interfere with the line, but has only a local effect on the receiving-instrument to prevent tailing on the chemical paper.

In the drawing, Figure 1 illustrates my invention in the form that I find most generally available. The batteries $a$ and $b$ are connected in opposite positions, the positive poles being toward each other, and the negative poles connected to the ground $g$ and line $l$, respectively. The transmitting-instrument $c$ is in a circuit, $d$, to the battery $b$, in which circuit $d$ is a resistance, $e$. When the circuit $d$ is broken, the two batteries $a$ $b$ neutralize each other, and there is no charge sent on the line; but when the circuit $d$ is closed through a perforation in the paper, or by a key, or otherwise, the battery $b$ is short-circuited, and the battery $a$, being unbalanced, sends a pulsation on the line. The artificial line between the receiving-instrument $f$ and the earth $g'$ is made by introducing a resistance or rheostat at $r$, preferably a tube containing liquid, with adjustable points. This rheostat is made to balance or equal, or nearly so, the resistance of the line $l$, and the instrument $f$ and the condenser $s$, or other accumulator of static electricity, is of a capacity to about equal that of the line; hence the receiving-instrument will occupy a zero or neutral point in regard to the static charge, from which the static charges will discharge both ways to $g$ and $g'$. The condenser or accumulator $s$ should be in sections, to bring in a greater or less number of sections by switches. When the receiving-instrument is chemical, the paper is preferably prepared by dipping it in a solution of at least one pound of iodide of potassium in one gallon of water, to which is added a small quantity of flour. This paper cannot be maintained at uniform moisture; hence its resistance to the passage of electricity varies. This is compensated for by the shunt-circuit $t$, in which is a resistance, $u$, sufficient to direct the necessary amount of electricity to the paper to make the mark, and allow the remainder to pass to the artificial line. Thus the varying condition of the paper does not change the resistance of the line.

I have discovered that when an electro-magnet is energized, and the circuit broken, a pulsation is set up in the opposite direction to that passing into such magnets. I avail of this to prevent tailing upon the chemical paper, and at $v$ I have shown an electro-magnet for this purpose. It will be seen that this electro-magnet will discharge itself within a short local circuit containing the receiving-instrument, and that the reactionary current therefrom, moving in the opposite direction to the main current, frees the receiving-instrument from the tailing caused by the discharge of static electricity, and this magnet $v$ may be employed in many places to effect the object before named, even when there is not an artificial line. In some instances with very long lines, there may be intermediate artificial lines, arranged as aforesaid, or reactionary magnets with branch circuits to the earth, to either receive drop copies in such branch circuits or to free the line of static electricity, and aid in obtaining the signals perfectly at the last receiving station with the greatest rapidity. Figs. 2 and 3 represent the same parts as before described; but in Fig. 2 only a single battery is shown, and the resistance $e$ is between the line and the earth, to regulate the proportion of electricity sent over the line, by adjusting such rheostat to prevent too great return to the battery through such rheostat. In Fig. 3 a condenser, $h$, is introduced in addition to this rheostat, that it may react between the pulsations of electricity on the main line to aid in clearing such line of the static charge.

I claim as my invention—

An artificial line between the receiving-instrument and the earth, to balance the resistance and static charge, or nearly so, at both sides of the receiving-instrument, substantially as set forth.

Signed by me this 23d day of April, A. D. 1873.

THOS. A. EDISON.

Witnesses:
GEO. D. WALKER,
GEO. T. PINCKNEY.